(12) United States Patent
Wu et al.

(10) Patent No.: US 9,034,947 B2
(45) Date of Patent: May 19, 2015

(54) SOLVENTLESS STRETCHABLE INK COMPOSITION

(71) Applicant: XEROX CORPORATION, Norwalk, CT (US)

(72) Inventors: Yiliang Wu, Oakville (CA); Cameron Derry, London (CA); Ping Liu, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/078,310

(22) Filed: Nov. 12, 2013

(65) Prior Publication Data

US 2014/0220312 A1   Aug. 7, 2014

Related U.S. Application Data

(60) Provisional application No. 61/849,815, filed on Feb. 6, 2013.

(51) Int. Cl.

| | | |
|---|---|---|
| *C09D 11/30* | (2014.01) | |
| *C08F 220/18* | (2006.01) | |
| *C08F 2/50* | (2006.01) | |
| *C08F 8/30* | (2006.01) | |
| *C08F 220/16* | (2006.01) | |
| *C08F 283/04* | (2006.01) | |
| *C08F 220/10* | (2006.01) | |
| *C08F 220/26* | (2006.01) | |
| *C08F 220/12* | (2006.01) | |
| *C08F 220/20* | (2006.01) | |
| *C08F 265/06* | (2006.01) | |
| *C08J 3/24* | (2006.01) | |
| *C08J 3/20* | (2006.01) | |
| *C08K 3/00* | (2006.01) | |
| *C08K 5/00* | (2006.01) | |
| *C08L 33/08* | (2006.01) | |
| *C08L 67/07* | (2006.01) | |
| *C08K 5/07* | (2006.01) | |
| *C08L 33/12* | (2006.01) | |
| *C08L 75/16* | (2006.01) | |
| *C08L 33/10* | (2006.01) | |
| *C08K 5/5397* | (2006.01) | |
| *C09D 11/104* | (2014.01) | |
| *C09D 175/16* | (2006.01) | |
| *C09D 11/10* | (2014.01) | |
| *C09D 11/02* | (2014.01) | |
| *C09D 167/07* | (2006.01) | |
| *C09D 11/102* | (2014.01) | |
| *C09D 11/107* | (2014.01) | |
| *C09D 11/101* | (2014.01) | |

(52) U.S. Cl.
CPC ............ *C09D 11/30* (2013.01); *Y10T 428/2481* (2015.01); *Y10T 428/24934* (2015.01); *Y10T 428/24802* (2015.01); *C08F 220/18* (2013.01); *C08F 2/50* (2013.01); *C08F 8/30* (2013.01); *C08F 220/16* (2013.01); *C08F 283/045* (2013.01); *C08F 220/10* (2013.01); *C08F 220/26* (2013.01); *C08F 220/12* (2013.01); *C08F 220/20* (2013.01); *C08F 265/06* (2013.01); *C08J 3/24* (2013.01); *C08J 3/20* (2013.01); *C08J 2333/08* (2013.01); *C08J 2333/10* (2013.01); *C08J 2333/12* (2013.01); *C08K 3/0033* (2013.01); *C08J 2367/07* (2013.01); *C08K 5/00* (2013.01); *C08K 5/0025* (2013.01); *C08J 2375/16* (2013.01); *C08L 33/08* (2013.01); *C08L 67/07* (2013.01); *C08K 5/07* (2013.01); *C08L 33/12* (2013.01); *C08L 75/16* (2013.01); *C08L 33/10* (2013.01); *C08K 5/5397* (2013.01); *C08L 2312/00* (2013.01); *C09D 11/104* (2013.01); *C09D 175/16* (2013.01); *C09D 11/10* (2013.01); *C09D 11/02* (2013.01); *C09D 167/07* (2013.01); *C09D 11/102* (2013.01); *C09D 11/107* (2013.01); *C09D 11/101* (2013.01)

(58) Field of Classification Search
CPC ............ C08F 2/50; C08F 8/30; C08F 220/10; C08F 220/12; C08F 220/16; C08F 220/18; C08F 220/20; C08F 220/26; C08F 265/06; C08F 283/045; C08J 3/20; C08J 3/24; C08J 2333/08; C08J 2333/10; C08J 2333/12; C08J 2367/07; C08J 2375/16; C08K 3/0033; C08K 5/00; C08K 5/0025; C08K 5/5397; C08K 5/07; C08L 33/08; C08L 33/10; C08L 33/12; C08L 67/07; C08L 75/16; C08L 2312/00; C09D 11/02; C09D 11/10; C09D 11/30; C09D 11/101; C09D 11/102; C09D 11/104; C09D 11/107; C09D 167/07; C09D 175/16
USPC .......... 522/33, 64, 90, 96, 104, 107; 523/160, 523/161; 525/123, 455
See application file for complete search history.

(56) References Cited

U.S. PATENT DOCUMENTS 5,128,391 A * 7/1992 Shustack ..................... 522/92
6,099,415 A * 8/2000 Lutz ............................ 473/357

OTHER PUBLICATIONS

Wu, et al., U.S. Appl. No. 13/182,579, filed Jul. 14, 2011
Wu, et al., U.S. Appl. No. 13/495,915, filed Jun. 13, 2012.

*Primary Examiner* — Patrick Niland
(74) *Attorney, Agent, or Firm* — Pillsbury Winthrop Shaw Pittman LLP (57) ABSTRACT

An ink composition suitable for ink jet printing, including printing on deformable substrates. In embodiments, the stretchable ink composition is based on a solventless monomer-based ink formulation comprising a mixture of acrylic ester oligomer and monomers of acrylic ester and aromatic acrylate.

19 Claims, 3 Drawing Sheets

SOLVENTLESS STRETCHABLE INK COMPOSITION

RELATED APPLICATIONS

This application claims priority to provisional U.S. Patent Application No. 61/849,815 filed on Feb. 6, 2013.

BACKGROUND

The present embodiments relate to ink compositions suitable for printing marks or images on deformable substrates. In particular, disclosed herein is a stretchable ink composition. These ink compositions can be used for ink jet printing.

Printing marks or images on deformable substrates is desirable for many applications, such as flexible medical devices, including surgical tools and implantable medical devices, robot skins, textiles (e.g., for stretchable swimming suits), rubber products such as tires, tubes, and cables, and the like. Consumable products based on rubbers and some textiles are also stretchable. Because of the highly deformable characteristic of the substrate, a stretchable ink is desired for printing on such substrates to achieve excellent image quality, image robustness, and image longevity.

Accordingly, while known compositions and processes are suitable for their intended purposes, a need remains for improved ink compositions with certain characteristics. Specifically, a need remains for ink compositions suitable for printing on deformable or stretchable substrates. Additionally, a need remains for stretchable inks that form robust images which can be stretched and relaxed for a high number of cycles. There is also a need for stretchable inks that have good color stability. There is also a need for stretchable inks that exhibit good resistance to environmental factors such as light, chemicals, water, and oxidizing gases, thus generating hydrophobic and water-resistance images. Ideally, the stretchable ink would be suitable for both indoor and outdoor applications. Lastly, it would be desirable that such inks can be applied digitally.

Previous work by the inventors included a stretchable ink composition which comprises water, a colorant, a surfactant, and a fluoroelastomer, as disclosed in U.S. patent application Ser. No. 13/182,579 to Wu et al., filed on Jul. 14, 2011, and an aqueous-based latex approach for elastic ink, as disclosed in U.S. patent application Ser. No. 13/495,915 to Wu et al., filed on Jun. 13, 2012, which are hereby incorporated by reference in their entireties. In contrast to the prior approaches, the present embodiments are based on a solventless approach. As such, there is no need to dry off residual water, which saves time and energy. In addition, there is no vapors from any organic solvents, so this approach is environmentally friendly.

SUMMARY

According to embodiments illustrated herein, there is provided a solventless stretchable ink composition comprising: a mixture of an acrylic ester oligomer, an acrylic ester monomer and an aromatic acrylate monomer; a photoinitiator; and a colorant, wherein the stretchable ink composition is capable of printing and forming robust images on a deformable substrate.

In particular, the present embodiments provide a solventless stretchable ink composition comprising: a mixture of an acrylic ester oligomer, an acrylic ester monomer and an aromatic acrylate monomer; a photoinitiator; and a colorant, wherein the stretchable ink composition is capable of being jetted onto a deformable substrate to form robust images.

In further embodiments, there is provided a patterned article comprising: a deformable substrate; and an image printed on the deformable substrate, the image being formed from a solventless stretchable ink composition comprising a mixture of an acrylic ester oligomer, an acrylic ester monomer and an aromatic acrylate monomer, a photoinitiator, and a colorant.

BRIEF DESCRIPTION OF THE DRAWINGS

For a better understanding of the present embodiments, reference may be had to the accompanying figures.

DETAILED DESCRIPTION

In the following description, it is understood that other embodiments may be utilized and structural and operational changes may be made without departure from the scope of the present embodiments disclosed herein.

The present embodiments provide an ultraviolet (UV) curable solventless stretchable ink composition based on a monomer approach. More specifically, the ink composition of the present embodiments comprise an acrylic ester monomer, an acrylic ester oligomer and an aromatic acrylate monomer. The ratio between these three components was optimized for achieving a desired balance of stretchability and jettability. The ink composition also comprises, in embodiments, one or more photoinitiators to minimize surface tackiness. The resulting ink composition demonstrated good printability and produced images having good stretchability, robustness and adhesion on silicon and latex rubber substrates. Thus, the printed images exhibit superior performance on the deformable substrates, which are generally difficult to print upon.

There are several challenges and/or requirements for monomer-based stretchable inks that are used for inkjetting. These challenges and/or requirements include: (i) good elongation after curing; (ii) low viscosity for inkjet printing; (iii) low or no tackiness on the substrate surface; and (iv) wide substrate latitude. Through extensive studies of varies oligomers and monomers, the present inventors have successfully identified a type of jettable ink formulation based on acrylic ester. In embodiments, an acrylate ester oligomer was "diluted" with an acrylic ester monomer to lower the viscosity, and an elastic aromatic acrylate was used to modify the hard segment for good elasticity.

A proper combination of hard and soft segments is important to achieve good elongation. As used herein, "hard segment" refers to a material which has a glass transition temperature (Tg) greater than room temperature such that it has "hard" qualities like a plastic at room temperature. As used herein, "soft segment" refers to a material which has a Tg less than room temperature such that it has "soft" qualities like a rubber at room temperature. Therefore, when monomers or oligomers are used for ink formulation, the combination of monomers and oligomers, and the crosslinking density are critical to ensure good elongation. Another challenge for monomer-based inks is that oligomers often have high viscosity which is not suitable for inkjet printing. Thus, how to reduce viscosity to a jettable range is a challenge. Another challenge is that the final cured ink should have a Tg less than room temperature for elongation, however, a low Tg component is generally very tacky at room temperature. Thus, proper formulation to reduce or eliminate tackiness is required. Finally, printing on rubber substrates, which stretchable inks are often used for, causes another host of challenges. Unlike printing on paper, which has high surface energy, rubber substrates, such as silicon rubber, generally have a low surface energy. Thus, good wettability on and excellent adhesion to many different rubber substrates are additional challenges.

Through extensive studies of varies oligomers and monomers, the present inventors have successfully formulated a stretchable and jettable ink that avoids all of the foregoing challenges. The ink of the present embodiments comprises a mixture of acrylic ester oligomer, and monomers of aromatic acrylate and acrylic esters. The inks showed very good elongation, low tack surface, and excellent adhesion on silicon and latex rubber substrates.

In particular embodiments, a weight ratio of the acrylic ester oligomer to the acrylic ester monomer to the aromatic acrylate monomer is from about 1:12:4 to about 1:3:1, although the amount can be outside of these ranges. In one embodiment, the ratio is 1:6:2. In further embodiments, the acrylic ester oligomer is present in the oligomer/monomer mixture in an amount of from 5 to about 30 percent, or of from 5 to about 25 percent, or of from 10 to about 20 percent by weight of the total weight of the ink composition, although the amount can be outside of these ranges. In such embodiments, the acrylic ester monomer is present in the oligomer/monomer mixture in an amount of from 30 to about 85 percent, or of from 30 to about 65 percent, or of from 35 to about 65 percent by weight of the total weight of the ink composition, although the amount can be outside of these ranges. In such embodiments, the aromatic acrylate monomer is present in the oligomer/monomer mixture in an amount of from 5 to about 40 percent, or of from 5 to about 30 percent, or of from 10 to about 30 percent by weight of the total weight of the ink composition, although the amount can be outside of these ranges. In embodiments, the acrylic ester oligomer is selected from the group consisting of monacrylate oligomer, diacrylate oligomers, triacrylate oligomers, multifunctional acrylate oligomers, and mixtures thereof. The acrylate oligomers could be aliphatic acrylates, aliphatic urethane acrylates, amine modified acrylates, epoxy acrylates, fatty acid-modified acrylates, polyester acrylate, silicone acrylates, and the like. In further embodiments, the acrylic ester monomer is selected from the group consisting of 4-hydroxybutyl acrylate, 2-hydroxyethyl acrylate, hydroxyethylcaprolactone acrylate, hydroxypropyl acrylate, butyl acrylate, dihydrodicyclopentadienylacrylate, hexyl acrylate, ethyldiglyko acrylate, stearyl acrylate, 2-methoxyethyl acrylate, octyl acrylate, and the like, and mixtures thereof. In further embodiments, the aromatic acrylate monomer has a structure of CH2-CR1COOR2, where in R1 is hydrogen or methyl group, R2 has from 6 to about 24 carbon atoms containing an aromatic group.

The oligomers used have a glass transition temperature of from about −70 to about 10° C., or from about −70 to about 0° C., or from about −70 to about −10° C. The monomers have a viscosity of from about 1.0 to about 50 cps, or from about 1.0 to about 30 cps, or from about 1.0 to about 20 cps at a printing temperature. A printing temperature is the temperature at which the ink is used to print the image. In specific embodiments, the acrylic ester monomer has a viscosity of from about 1.0 to about 8 cps at the printing temperature. In embodiments, the aromatic acrylate monomer has a viscosity of from about 1.0 to about 50 cps at a printing temperature. The oligomers have a viscosity of from about 800 to about 12,000, or from about 1,000 to about 10,000, or from about 1,500 to about 8,000 cps at the printing temperature. The cured ink composition have an elongation of from about 110% to about 800%, or from about 110% to about 500%, or from about 150% to about 500%.

The ink composition further comprises one or more photoinitators. Such an initiator is desirable for assisting in curing of the ink. In embodiments, a photoinitiator that absorbs radiation, for example UV light radiation, to initiate curing of the curable components of the ink may be used. As the photoinitiator for ink compositions that are cured by free-radical polymerization, for instance, ink compositions containing acrylate groups or inks comprised of polyamides, mention may be made of photoinitiators such as benzophenones, benzoin ethers, benzil ketals, α-hydroxyalkylphenones, α-alkoxyalkylphenones α-aminoalkylphenones and acylphosphine photoinitiators sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-benzyl 2-dimethylamino 1-(4-morpholinophenyl)butanone-(available as Ciba IRGACURE 369); 2-hydroxy-1-(4-(4-(2-hydroxy-2-methylpropionyl)-benzyl)-phenyl)-2-methylpropan-1-one (available as Ciba IRGACURE 127); 2-dimethylamino-2-(4-methylbenzyl)-1-(4-morpholin-4-ylphenyl)-butanone (available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methyl-1-(4-(1-methylvinyl)phenyl) propanone); 2-hydroxy-2-methyl-1-phenyl-1-propanone; benzyl-dimethylketal; and mixtures thereof. Mention may also be made of amine synergists, which are described as co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free-radical reaction upon exposure to a desired wavelength of radiation such as UV light can be used without limitation.

The photoinitiator may absorb radiation of about 200 to about 420 nm wavelengths in order to initiate cure, although use of initiators that absorb at longer wavelengths, such as the titanocenes that may absorb up to 560 nm, can also be used without restriction.

The total amount of initiator included in the ink composition may be from, for example, about 0.5 to about 15 percent by weight, such as from about 1 to about 10 percent by weight, of the ink composition.

The inks disclosed herein also contain a colorant. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza (18) annulenes, formazan copper complexes, triphenodioxazines, and the like; and the like, as well as mixtures thereof. The dye is present in the ink composition in any desired or effective amount, in one embodiment from about 0.05 to about 15 percent by weight of the ink, in another embodiment from about 0.1 to about 10 percent by weight of the ink, and in yet another embodiment from about 1 to about 5 percent by weight of the ink, although the amount can be outside of these ranges.

Examples of suitable pigments include black pigments, white pigments, cyan pigments, magenta pigments, yellow pigments, or the like. Further, pigments can be organic or inorganic particles. Suitable inorganic pigments include, for example, carbon black. However, other inorganic pigments may be suitable such as titanium oxide, cobalt blue (CoO—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW 18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

Within the ink compositions disclosed herein, the pigment is present in any effective amount to achieve the desired degree of coloration, in one embodiment in an amount of from about 0.1 to about 15 percent by weight of the ink, in another embodiment from about 1 to about 10 percent by weight of the ink, and in yet another embodiment from about 2 to about 7 percent by weight of the ink, although the amount can be outside these ranges.

In one embodiment, the ink after curing has a tensile strength of at least about 0.5 MPa, in another embodiment at least about 1.0 MPa, and in yet another embodiment at least about 3.0 MPa, and in another embodiment at least about 5.0 mPa, and in one embodiment no more than about 25 MPa, in another embodiment no more than about 20 MPa, and in yet another embodiment no more than about 18 MPa, as measured by ASTM D412C, although the tensile strength can be outside of these ranges.

In one embodiment, the ink after curing has an elongation at break of at least about 150%, in another embodiment at least about 200%, and in yet another embodiment at least about 400%, and in one embodiment no more than about 1100%, in another embodiment no more than about 1000%, and in yet another embodiment no more than about 800%, as measured by ASTM D412C, although the elongation at break can be outside of these ranges.

In one embodiment, the ink after curing has a hardness (Shore A) value of at least about 20, in another embodiment at least about 30, and in yet another embodiment at least about 40, and in one embodiment no more than about 90, in another embodiment no more than about 85, and in yet another embodiment no more than about 80, as measured by ASTM 2240, although the hardness can be outside of these ranges.

In one embodiment, the ink after curing has a glass transition temperature of at least about −70° C., in another embodiment at least about −50° C., and in yet another embodiment at least about −40° C., and in one embodiment no more than about 25° C., in another embodiment no more than about 0° C., and in yet another embodiment no more than about −10° C., although the Tg can be outside of these ranges. In another embodiment, the ink after curing has a first lower glass transition temperature from about −70 to about 00, including from about −60 to about −100, or from about −50 to about −10 C; and a second higher glass transition temperature from about 25 C to about 100 C, including from about 25 to about 80 C, or from about 25 C to about 6° C.

Other optional additives to the inks include biocides, fungicides, pH controlling agents such as acids or bases, phosphate salts, carboxylates salts, sulfite salts, amine salts, buffer solutions, and the like, sequestering agents such as EDTA (ethylene diamine tetra acetic acid), viscosity modifiers, leveling agents, and the like, as well as mixtures thereof.

In one embodiment, the ink composition is a low-viscosity composition. The term "low-viscosity" is used in contrast to conventional high-viscosity inks such as screen printing inks, which tend to have a viscosity of at least 1,000 cps. In specific embodiments, the ink disclosed herein has a viscosity of in one embodiment no more than about 100 cps, in another embodiment no more than about 50 cps, and in yet another embodiment no more than about 20 cps, although the viscosity can be outside of these ranges. When used in ink jet printing applications, the ink compositions are generally of a viscosity suitable for use in said ink jet printing processes. For example, for thermal ink jet printing applications, at room temperature (i.e., about 25° C.), the ink viscosity is in one embodiment at least about 1 centipoise and in one embodiment is no more than about 10 centipoise, in another embodiment no more than about 7 centipoise, and in yet another embodiment no more than about 5 centipoise, although the viscosity can be outside of these ranges. For example, for piezoelectric ink jet printing, at the jetting temperature, the ink viscosity is in one embodiment at least about 2 centipoise, and in another embodiment at least about 3 centipoise, and in one embodiment is no more than about 20 centipoise, in another embodiment no more than about 15 centipoise, and in yet another embodiment no more than about 10 centipoise, although the viscosity can be outside of these ranges. The jetting temperature can be as low as about 20 to 25° C., and can be in one embodiment as high as about 90° C., in another embodiment as high as about 60° C., and in yet another embodiment as high as about 40° C., although the jetting temperature can be outside of these ranges.

The ink compositions in one embodiment have a surface tension of at least about 22 dynes per centimeter, in another embodiment at least about 25 dynes per centimeter, and in yet another embodiment at least about 28 dynes per centimeter, and in one embodiment no more than about 40 dynes per centimeter, in another embodiment no more than about 38 dynes per centimeter, and in yet another embodiment no more than about 35 dynes per centimeter, although the surface tension can be outside of these ranges.

The ink compositions in one embodiment contain particulates having an average particle diameter of no larger than about 5 μm, in another embodiment no larger than about 2 μm, in yet another embodiment no larger than about 1 μm, and in still another embodiment no larger than about 0.5 μm, although the particulate size can be outside of these ranges. In specific embodiments, the polyurethane elastomer is in an emulsion form in the ink, having an average particle diameter of in one embodiment no larger than about 2 μm, in another embodiment no larger than about 1 μm, and in yet another embodiment no larger than about 0.5 μm, although the particulate size can be outside of these ranges.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in one embodiment from about 5 to about 10 minutes. Alternatively, the optional ink additives can be mixed with the other ink ingredients during the ink preparation process, which takes place according to any desired procedure, such as by mixing all the ingredients, heating if desired, and filtering.

Also disclosed herein is a process which comprises applying an ink composition as disclosed herein to a substrate in an imagewise pattern.

The ink compositions can be used in a process which entails incorporating the ink composition into an ink jet printing apparatus and causing droplets of the ink to be ejected in an imagewise pattern onto a substrate. In a specific embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed.

In a specific embodiment, the process entails printing the ink onto a deformable substrate, such as textile, rubber sheeting, plastic sheeting, or the like. In some embodiments, the substrate is a stretchable substrate, such as textile or rubber sheets. In other embodiments, the substrate is a plastic which is deformable at an elevated temperature higher than the glass transition temperature of the plastic, for example, in the process of molding into 3-dimensional objects. When the ink disclosed herein is used, the imagewise pattern will not be damaged upon molding. The rubber sheets with the imagewise pattern can be used, for example, as wrap for a 3-D object.

In one embodiment, the inks disclosed herein can be printed on a rubber substrate, such as natural polyisoprene, polybutadiene rubber, chloroprene rubber, neoprene rubber, butyl rubber (copolymer of isobutylene and isoprene), styrene-butadiene rubber, silicon rubber, nitrile rubber (which is a copolymer of butadiene and acrylonitrile), ethylene propylene rubber, ethylene propylene diene rubber, epichlorohydrin rubber, polyacrylic rubber, ethylene-vinyl acetate, polyether block amides, polysulfide rubber, chlorosulfonated polyethylene as Hypalon, or the like. In a specific embodiment, the inks disclosed herein can be printed on a silicon rubber, polyacrylic rubber, butyl rubber, or neoprene rubber substrate and the imaged substrate can be stretched in one axial direction (i.e., along the x-axis, as opposed to both the x-axis and the y-axis) to in one embodiment at least 110%, in another embodiment at least 150%, in yet another embodiment at least 200%, and in yet another embodiment at least 500% of the length of its original dimension, in one embodiment at least about 50 times (stretching-relaxation cycles), in another embodiment at least about 100 times, and in yet another embodiment at least about 500 times, without exhibiting cracks or delamination.

In one embodiment, the inks disclosed herein can be printed on a silicon rubber, polyacrylic rubber, butyl rubber, or neoprene rubber substrate and the imaged substrate can be submerged in water for in one embodiment at least about 1 day, in another embodiment for at least about 1 week, and in yet another embodiment for at least about 1 month, without exhibiting damage to the imagewise pattern.

In a specific embodiment, the images generated with the inks disclosed herein are highly water-resistant. In one embodiment, images generated with the inks exhibit a water droplet contact angle of at least about 80°, in another embodiment at least about 90°, and in yet another embodiment at least about 95°, although the contact angle can be outside of these ranges. The water-resistant characteristic renders the ink disclosed herein suitable for outdoor applications or printing on water-related products such vehicle wrap, swimming suits, and the like.

In a specific embodiment, the images generated with the inks disclosed herein have a good chemical resistance. For example, they can exhibit good to excellent resistance toward alcohols, acetic acid, acetamide, allyl bromide, allyl chloride, benzoyl chloride, ethers, esters, hydrocarbons, blood, salt solutions, and the like.

In embodiments, the images generated with the inks disclosed herein form continuous layer on the substrate. Therefore, the images will have a small color difference with or without stretching. This is in contrast to some conventional stretchable images that are composed of dots array. Images based on discontinuous dots array have poor image quality, especially upon stretching, for example, the color density will decrease dramatically. In embodiments, the images generated with the stretchable ink composition has color difference (ΔE) less than 5.0, or less than 3.5, or less than 2.0, or less than 1.0, when stretched in one axial direction to about 150%. It is generally known that untrained naked human eyes cannot differentiate the colors with color difference (ΔE) values of <3.0. Color difference (ΔE) values of >6.0 are considered a very obvious color difference.

In embodiments, the images have an excellent adhesion on various substrates prior to or after stretching. The adhesion can be semi-quantified by measuring the adhesive force between the image materials and the substrate materials. In a simple test, a 3M Scotch tape can be used to peel off an image printed on a substrate. The percentage of the image which is peeled off can be used to quantify the adhesion. Zero percent indicates an excellent adhesion, while 100% shows a very poor adhesion. In other embodiments, the images have a very poor adhesion on selected rubber substrates such as silicon rubber substrate. Therefore, the images could be a temporary image that can be subsequently transferred to other substrates. Poor adhesion will allow proper transfer of the image.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Commercially available oligomer CN9021 from Sartomer (Exton, Pa.), a class of acrylic ester, was initially identified as an elastomeric material after self-curing tests. However, this oligomer has a high viscosity (around 5000 cps), which is not jettable. To lower the viscosity, a small molecular acrylic ester CD420, also commercially available from Sartomer, having a low viscosity was used. However, since this small molecular acrylic ester becomes hard segment after UV curing, addition of the monomer CD420 caused hardening of the film and a severe reduction in elasticity to the point of creating cracks. To overcome this challenge, a third component with good elongation was added to modify the hard segment to improve the elasticity. Monomer CD590, from Sartomer, a class of aromatic acrylate monomer, was added to the CN9021+ CD420 mixture. This three-component mixture demonstrated improved elasticity while retaining a low viscosity for jetting. Thus, the third component helped modify the hard segment to improve the elasticity of the final ink. Table 1 shows the characteristics of the specific monomers and oligomers used.

TABLE 1

| Trade Name | Material Description | Estimated Elongation | Glass Transition Temperature (° C.) | Viscosity at 60° C. (mPa-s) |
|---|---|---|---|---|
| CN 9021 | Acrylic ester oligomer | 1100% | −54 | 5,000 |
| CD 420 | Acrylic ester monomer | Unknown | 23 | 3.4 |
| CD 590 | Aromatic acrylate monomer | 240% | 29 | 21 |

After a thorough investigation into the ratio of the three components on the elasticity, surface tack, ink viscosity and printing quality, a final optimized formulation was chosen as described below in Table 2. The ink was optimized for printing performance in the Dimatix piezoelectric printer, equipped with 10 pL cartridge. The acrylate ester based ink had the best printing performance at 15 μm drop spacing and at 60° C. The ink had exemplary lifetime once loaded in the print head, with all nozzles working and remaining unclogged for weeks.

TABLE 2

| Component | wt % |
|---|---|
| Irgacure UV10 | 0.2 |
| Irgacure IC819 | 1.0 |
| Irgacure IC127 | 3.5 |
| CN9021 | 10.0 |
| CD590 | 20.0 |
| CD420 | 64.3 |
| Pigment | 1.0 |
| Total | 100.0 |
| Properties | |
| Viscosity Range @ 60° C. (mPa-s) | 10.6-9.7 |
| Avg Viscosity @ 60° C. (mPa-s) | 10.15 |

Figure 1:
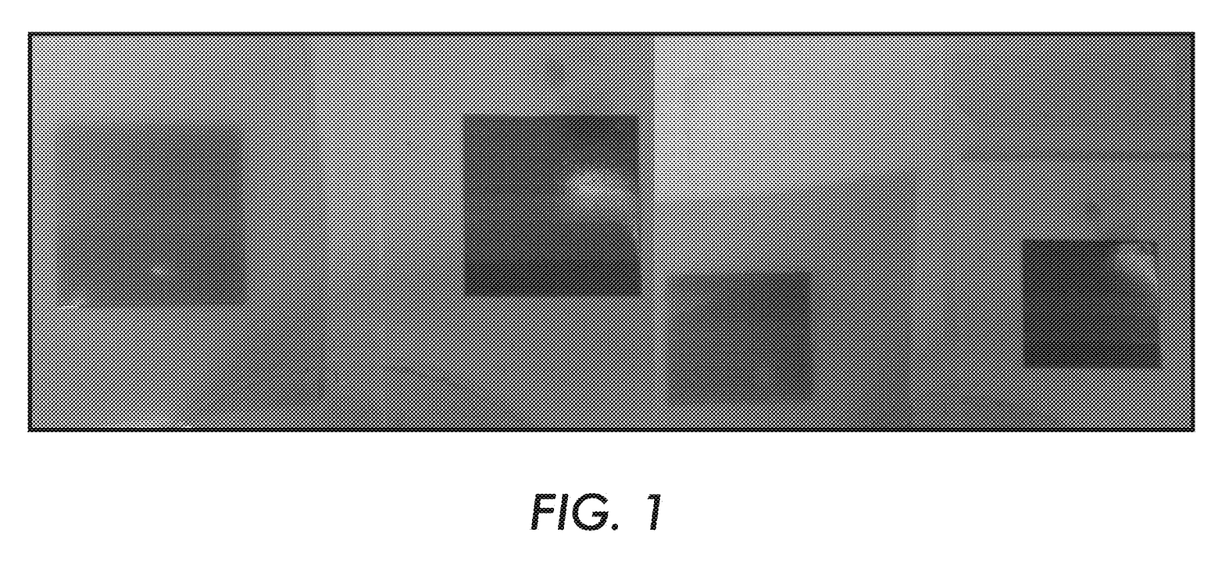
FIG. 1 is a photograph of an image showing good adhesion of prints made with the inks of the present embodiments.

Images were printed onto plasma cleaned latex and silicone substrates according to the optimized parameters. The two substrates were purchased from commercial sources and cleaned before printing. They were rinsed with IPA solvent before being plasma cleaned for 1 minute in air plasma. The inks were printed in a 4 cm×4 cm square, with two printing passes before curing. The ink had very good adhesion on the silicone and latex substrates. The cured image was intact and unaffected by multiple stretching cycles and vigorous rubbing of the image. Tape test was conducted to verify the adhesion using scotch tape. All films passed the tape adhesion test, even on the silicone substrate after multiple stretching cycles, as shown in FIG. 1 (tape testing showed no ink on the tape (right)). This result was surprising as silicone rubber is notoriously difficult for a printed film to adhere to.

Figure 2A:
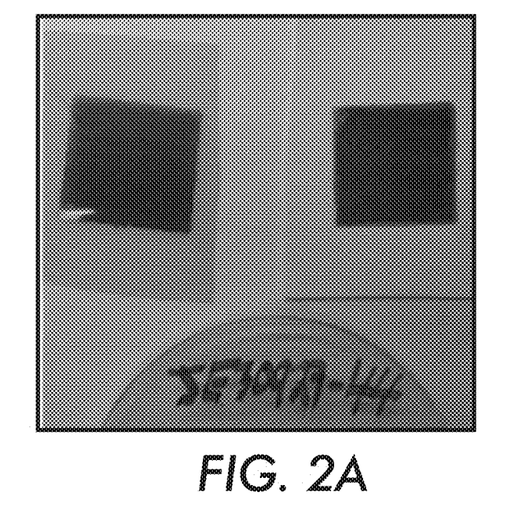
FIGS. 2A and 2B are photographs of images comparing the adhesion of prints made with the inks of the present embodiments as compared to a conventional UV-curable ink.
Figure 2B:
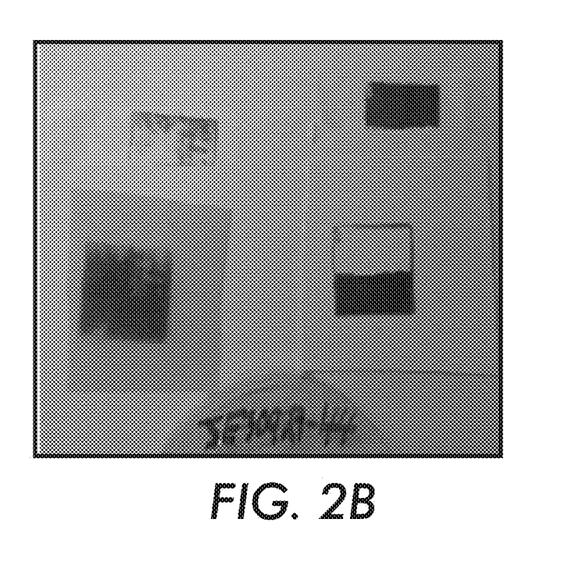
Figure 3:
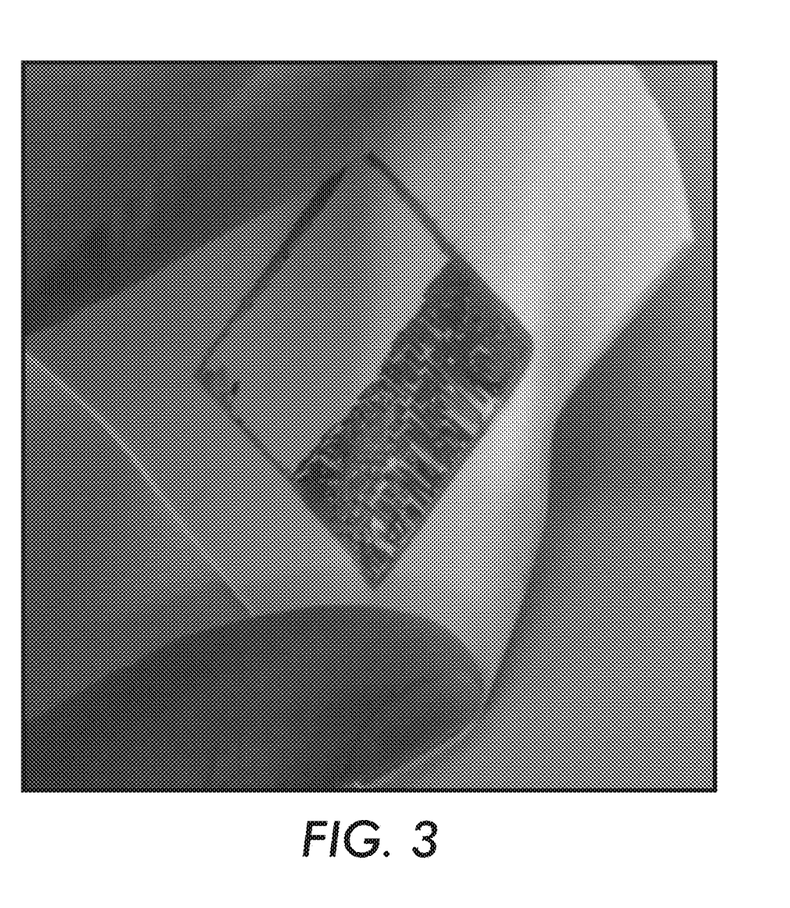
FIG. 3 is a photograph demonstrating how the conventional UV-curable ink after stretching shows considerable cracks.

Images corresponding to the printed cured films of the acrylate ester based ink on silicone and latex, as well as their tape test after stretching are shown below in FIG. 2A. A comparison is made to a conventional UV-cure ink with the same printing and cure conditions in FIG. 2B and FIG. 3. As seen in FIG. 2B, the adhesion of this ink was quite poor on both silicon and latex even before stretching. FIG. 3 demonstrates how the conventional UV-curable ink after stretching shows considerable cracks.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A solventless stretchable ink composition comprising:
a mixture of an acrylic ester oligomer, an acrylic ester monomer and an aromatic acrylate monomer, wherein the acrylic ester monomer has a viscosity of from about 1.0 to about 8 cps at the printing temperature;
a photoinitiator; and
a colorant, wherein the stretchable ink composition is capable of printing and forming images on a deformable substrate, and the image printed with the stretchable ink composition after curing has a first lower glass transition temperature of from about −70 to about 0° C. and a second higher glass transition temperature of from about 25 to about 80° C.

2. The solventless stretchable ink of claim 1, wherein a weight ratio of the acrylic ester oligomer to the acrylic ester monomer to the aromatic acrylate monomer is from about 1:12:4 to about 1:3:1.

3. The solventless stretchable ink of claim 1, wherein the acrylic ester oligomer is present in the mixture in an amount of from 5 to about 30 percent by weight of the total weight of the solventless stretchable ink composition.

4. The solventless stretchable ink of claim 1, wherein the acrylic ester monomer is present in the mixture in an amount of from 30 to about 85 percent by weight of the total weight of the solventless stretchable ink composition.

5. The solventless stretchable ink of claim 1, wherein the aromatic acrylate monomer is present in the mixture in an amount of from 5 to about 40 percent by weight of the total weight of the solventless stretchable ink composition.

6. The solventless stretchable ink of claim 1, wherein the photoinitiator is present in the mixture in an amount of from 1.0 to about 10 percent by weight of the total weight of the solventless stretchable ink composition.

7. The solventless stretchable ink of claim 1, wherein the photoinitiator is selected from the group consisting of alpha-hydroxy ketones, mono-acyl phosphine oxides, bis-acyl phosphine oxides, and mixtures thereof.

8. The solventless stretchable ink of claim 1, wherein the acrylic ester oligomer has a viscosity of from about 1,000 to about 10,000 cps at a printing temperature.

9. The solventless stretchable ink of claim 1, wherein the aromatic acrylate monomer has a viscosity of from about 1.0 to about 50 cps at a printing temperature.

10. The solventless stretchable ink of claim 1, wherein the acrylic ester oligomer has a glass transition temperature of from about −70 to about 0° C.

11. A solventless stretchable ink composition comprising:
a mixture of an acrylic ester oligomer, an acrylic ester monomer and an aromatic acrylate monomer, wherein the acrylic ester monomer has a viscosity of from about 1.0 to about 8 cps at the printing temperature;
a photoinitiator; and
a colorant, wherein the stretchable ink composition is capable of being inkjetted onto a deformable substrate to form images, and the image printed with the stretchable ink composition after curing has a first lower glass transition temperature of from about −70 to about 0° C. and a second higher glass transition temperature of from about 25 to about 80° C., and further wherein the solventless ink composition has a viscosity of from about 5 to about 20 cps at the jetting temperature.

12. A solventless stretchable ink composition comprising:
a mixture of an acrylic ester oligomer, an acrylic ester monomer and an aromatic acrylate monomer;
a photoinitiator; and
a colorant, wherein the stretchable ink composition is capable of being inkjetted onto a deformable substrate to form images; wherein the image printed with the stretchable ink composition after curing has a first lower glass transition temperature of from about −70 to about 0° C. and a second higher glass transition temperature of from about 25 to about 80° C.

13. The solventless stretchable ink composition of claim 11, wherein an image printed with the stretchable ink composition after curing having a tensile strength of from about 1.0 MPa to about 25 MPa.

14. The solventless stretchable ink composition of claim 11, wherein an image printed with the stretchable ink composition can be stretched in one axial direction to up to at least 110% along the length of its original dimension without exhibiting any visible cracks or delamination to the naked human eye.

15. The solventless stretchable ink composition of claim 11, wherein an image printed with the stretchable ink composition can be stretched in one axial direction to from about 110% to about 500% along the length of its original dimension without exhibiting any visible cracks or delamination to the naked human eye.

16. The solventless stretchable ink of claim 12, wherein the acrylic ester oligomer is present in the mixture in an amount of from 5 to about 30 percent by weight of the total weight of the solventless stretchable ink composition.

17. The solventless stretchable ink of claim 12, wherein the acrylic ester monomer is present in the mixture in an amount of from 30 to about 85 percent by weight of the total weight of the solventless stretchable ink composition.

18. The solventless stretchable ink of claim 12, wherein the aromatic acrylate monomer is present in the mixture in an amount of from 5 to about 40 percent by weight of the total weight of the solventless stretchable ink composition.

19. The solventless stretchable ink of claim 12, wherein the photoinitiator is present in the mixture in an amount of from 1.0 to about 10 percent by weight of the total weight of the solventless stretchable ink composition.

* * * * *